INVENTORS
ALBERT W. ENGEL
GERALD J. FORBES
BY Robert M. Dunning
ATTORNEY

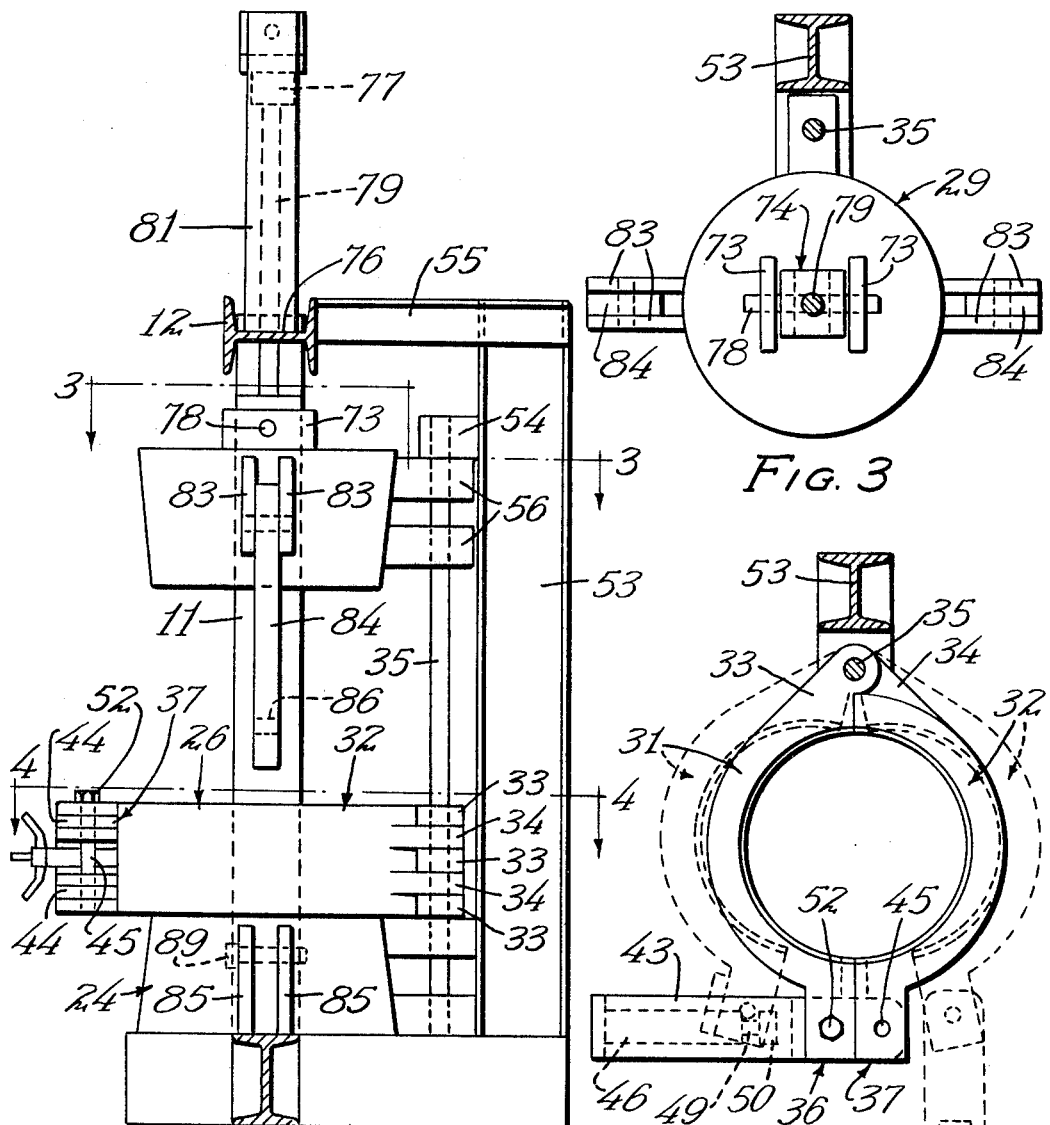
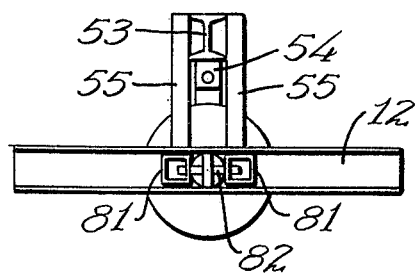

INVENTORS
ALBERT W. ENGEL
GERALD J. FORBES

United States Patent Office 3,501,934
Patented Mar. 24, 1970

3,501,934
APPARATUS FOR REPAIRING KEGS
Albert W. Engel and Gerald J. Forbes, St. Paul, Minn., assignors to Engel-Forbes, Inc., St. Paul, Minn., a corporation of Minnesota
Filed Mar. 20, 1967, Ser. No. 624,565
Int. Cl. B21d 26/08
U.S. Cl. 72—62                           3 Claims

ABSTRACT OF THE DISCLOSURE

This disclosure resides in a method and apparatus for repairing metal kegs, such as the aluminum kegs used for containing beer. The apparatus includes a die shaped to the outside form of the keg. The deformed externally projecting parts of the keg are pressed into an area defining original confines of the keg. In other words all external projections are forced inwardly by pressure. To return the keg to its original condition, the keg is filled with water, and an explosive is placed in the keg. The explosive is detonated to blow the keg back to its original form. The method comprises a hydraulic means of expanding kegs against a closed die to return the kegs to their original shape.

---

This invention relates to an improvement in method and apparatus for repairing kegs and deals particularly with an apparatus capable of restoring a keg to its original shape, and a method of repairing the keg.

Beer and similar liquids are comonly stored in aluminum kegs before delivery to taverns and other establishments. Due to the fact that the kegs contain several gallons of the liquid, they are obviously heavy to handle. As a result, in removing the kegs from the truck and in the delivery of the kegs to the user, the kegs are often dented and otherwise injured. When the keg is dented the content of the keg is often reduced. As a result, when a keg gets dented to a certain degree, it must be either discarded or repaired in order to meet government inspection.

Various ways of repairing the kegs have been devised. Probably one of the most successful methods devised in the past has been to cut a disc from one end of the keg, and to insert into the keg a suitable die which cooperates with an external die to restore the keg to its original shape. This process has been successfully carried out for a number of years. After the ends of the kegs have been returned to their original shape, the disc which has been cut from the end of the keg is replaced and rewelded into position. While this method has proven highly successful, it still requires considerable time, particularly in the time required to weld the removed disc into place so that the keg will withstand the necessary pressure.

It has been found that the operation may be greatly simplified by placing the keg into a suitable die which fits the contour of the keg, filling the keg with water, and applying force to return the keg to its original shape inside the form. Preferably, the force is applied by an explosive somewhat similar to dynamite, cordite or the like. By immersing the explosive in the liquid and detonating the explosive, the resulting explosion will force the outer surface of the keg against the surface of the die, restoring the keg to its original shape in a single simple operation.

A feature of the present invention resides in the provision of a method of repairing kegs which includes the step of first subjecting the keg to external pressure so that any portions of the keg which are bent beyond the original dimensions of the keg are returned to within the normal keg dimensions. In other words, any convex areas on the external surface of the keg are flexed inwardly so that the entire keg is within the original dimensions. The keg is then filled with liquid, and the explosive charge is detonated within the liquid, restoring the inwardly indented areas to their original shape by hydraulic force.

A further feature of the present invention resides in the provision of a mold which is shaped to conform with the original shape of the keg and which includes a bottom section designed to accommodate the lower extremity of the keg, a top section designed to accommodate the upper end of the keg, and an intermediate portion designed to encircle the externally ribbed intermediate portion of the keg. The upper mold section is hydraulically supported so that by moving the upper section toward the bottom section in the manner of a hydraulic press, the two parts of the mold will return the keg to its original shape and will remove any externally convex areas in the keg ends. The parts of the mold are secured together, and are of sufficient strength to resist the effect of an internal explosion. A suitable amount of explosive material equipped with a detonating cap is inserted into the top of the keg which has been previously filled with water or similar liquid. When the cap is detonated, the water within the keg is subjected to pressure sufficient to force the wall of the keg against the female die, returning the exterior of the keg to its original shape in a single operation.

One of the difficulties that has been experienced with previous methods lies in the fact that aluminum kegs are usually damaged by external forces such as occurs when the keg is dropped onto a street or sidewalk, causing the keg to be dented inwardly. This reduces the volume of the contents to a point where the keg is no longer acceptable. In order to correct this difficulty, it is necessary to exert a force against the keg from the interior thereof. In the past this has only been possible by the previously described method. With the present arrangement, the force which extends the keg against the die is hydraulic, and the force is created by the detonation of an explosive material, the force of the blast being sufficient to expand the surface of the keg against the surface of a containing die. Thus in many cases, the keg can be returned to its original shape in the length of time which was previously required to cut the opening in the keg for the reshaping die. In any event the entire operation can be completed in a very small fraction of the time which was previously required to reshape the kegs.

These and other objects and novel features of the present invention will be more clearly and fully set forth in the following specification and claims.

In the drawings forming a part of the specification:

FIGURE 2 is a side elevation similar to FIGURE 1, showing the general arrangement of the parts therein.

FIGURE 3 is a horizontal sectional view showing the upper portion of the die, the position of the section being indicated by the line 3—3 of the drawings.

FIGURE 4 is a top plan view of the intermediate portion of the die, the position of the section being indicated by the line 4—4 of FIGURE 2.

FIGURE 7 is a top plan view of the apparatus.

The apparatus is illustrated in general by the letter A and includes a heavy base portion 10 from which extend upwardly a pair of opposed standards 11. The standards 11 are connected by a cross-connecting beam 12. The framework is mainly made of steel I-beam construction in order to withstand the effects of the explosive charges.

Figure 5:
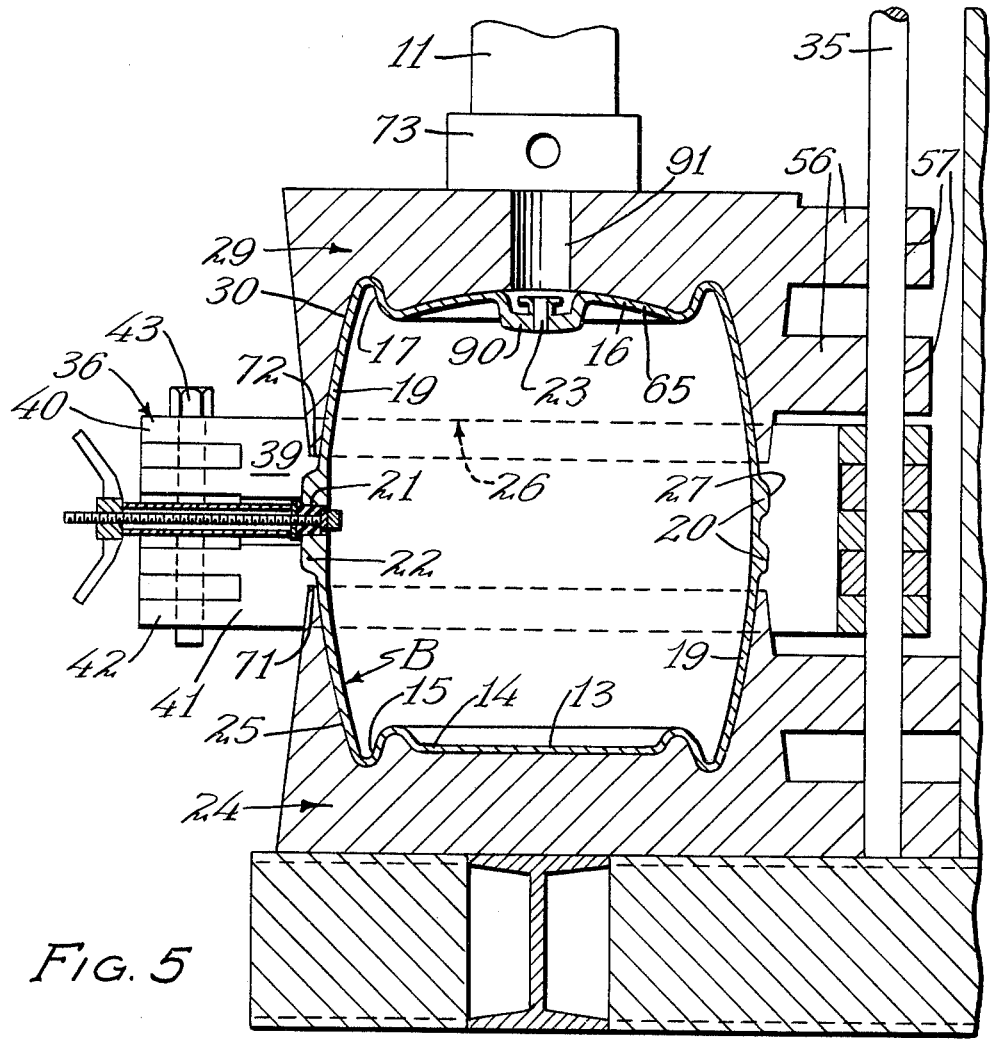
FIGURE 5 is a vertical sectional view through the die in its closed position.

The keg to be repaired is indicated in general by the letter B. As indicated in FIGURE 5, each keg B includes an outwardly bowed bottom end 13 including a flattened area 14, surrounded by a hollow rim 15. The keg also includes an outwardly bowed or domed upper end 16 encircled by a hollow rim 17. The outwardly bowed side walls 19 of the keg include a pair of longitudinally spaced thickened ribs 20 on opposite sides of the center therof. A bung opening 21 extends through a thickened area 22 between the ribs 20. The bung opening is located in a predetermined relation to the flat area 14 of the keg bottom. An aperture 23 is provided at the center of the domed top end 16.

The die is indicated in general by the letter C. The die includes a bottom section 24 which includes a cavity 25 of a shape designed to snugly accommodate the lower portion of the keg B. The die includes an intermediate section 26 having an interior surface 27 designed to accommodate the central ribbed portion of the keg. The die C also includes a top section 29 having an interior cavity 30 which is shaped to closely fit the contour of the upper section of the keg.

The intermediate die section 26 includes semicircular ring sections 31 and 32 which abut together to form a complete ring. The ring sections 31 and 32 are provided with overlapping hinge ears 33 and 34 which are pivoted about a pivot shaft 35 extending vertically intermediate between, but offset from the plane of the uprights 11. The ring sections 31 and 32 are provided with pairs of vertically spaced bifurcated lugs 36 and 37 projecting in a generally radial direction from the abutting ends thereof. Both of these lugs are similarly formed, and the detail of construction is best shown in FIGURE 5. As indicated, the lug 36 includes an upper lug 39 having a bifurcated outer end 40 and a lower lug 41 having a bifurcated outer end 42. The lugs 37 are similarly formed.

A generally U-shaped frame 43 has its parallel sides 44 pivoted between the bifurcated ends of the lugs 37 by means of a pivot 45. The parallel sides 44 also engage between the bifurcated ends of the lugs 36 when in the position shown in full lines in FIGURE 1 of the drawings. The frame 43 may be swung forwardly into the dotted outline position in FIGURE 4 when the ring sections 31 and 32 are opened into the dotted outline position of this figure. A cylinder 46 is supported on the base of the frame 43 between the frame sides 44. A piston 47 in the cylinder 46 is provided with a piston rod 49 supporting a bearing plate 50 which may be used to clamp the ring sections together. The bearing plate engages on an abutment plate 51 welded to the lug 36. When fully compressed, the lugs 36 and 37 are locked in place by a pin 52 which is inserted through the bifurcated ends of the lug 36 and through the sides 44 of the frame 43.

As indicated in FIGURE 7, an upright beam 53 extends upwardly from the base 10 parallel to, and adjacent to, the shaft 35. A bracket 54 extends forwardly from the beam to hold the upper end of the shaft 35 in position. Braces 55 extend from the top of the beam 53 to the cross beam 12 to hold the beam upright. The upper mold section 29 is provided with a pair of vertically spaced radially extending arms 56 which are provided with bearing apertures 57 slidable upon the vertical shaft 35.

Figure 6:
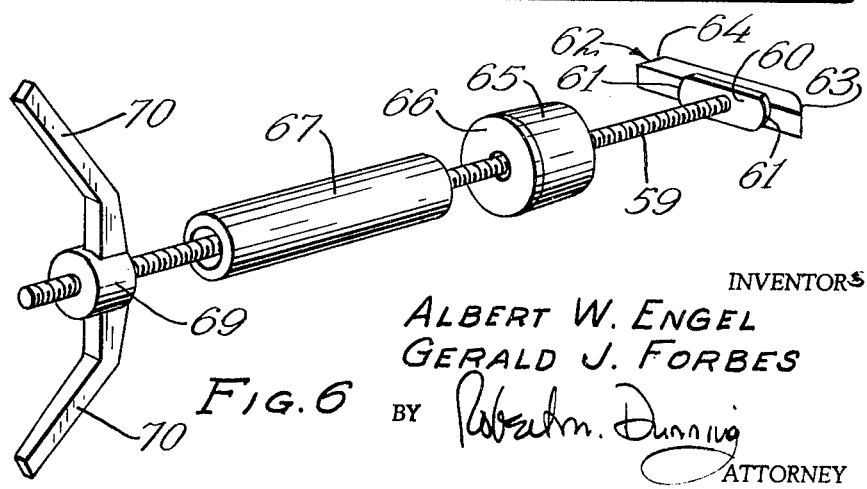
FIGURE 6 is a perspective view of a plug employed to close the bung hole of the keg so that the keg may be filled with water.

A means is provided for closing the bung opening 21 in the thickened area 22 at the center of the keg wall. This means is best illustrated in FIGURE 6 of the drawings. A threaded shaft 59 is provided at one end with a positioning plate 60 having curved ends 61 concentric with the shaft 59 and designed to enter the bung opening and to position the rod 59 centrally of the bung opening. A cross-member 62 is secured to the outer surface of the positioning plate 60 and is of proper length to bridge the opening. One end 63 of the cross-member 62 is rounded or tapered as indicated while the other end 64 of the cross-member is somewhat longer than the end 63. The arrangement is such that the longer end 64 of the cross-member may be hooked through the bung opening, and the shorter end 63 is then swung through the opening while the positioning plate 60 is within the keg. When the cross-member 62 is entirely within the keg, the threaded shaft 59 is moved outwardly until the positioning plate 60 engages the inner end of the bung opening.

A resilient plug 65 is slidably supported upon the shaft 59 and is reinforced at its outer end by a washer 66. A tubular spacer pipe 67 is also slidably supported upon the threaded shaft 59. A nut 69 having outwardly extending operating arms 70 is mounted upon the end of the shaft 59. The resilient plug 65 is inserted into the bung opening, and held in place by the washer 66 which is engaged by the spacer pipe 67. By tightening the nut 69, the resilient plug may be expanded in the bung opening sufficiently so that the joint is watertight. The structure thus described extends radially from the keg and between the sides of the frame and between the upper and lower portions of the lugs 36 and 37, the member extending between the pivot 45 and the locking bolt 52 as is seen in FIGURE 1 of the drawings.

As indicated in FIGURE 5 of the drawings, the semicircular ring sections 31 and 32 are provided with internal shoulders 71 which rest upon the upper surface of the mold section 24 when the mold is closed. These sections 31 and 32 also provide shoulders 72 which limit the insertion of the top mold section 29 into the intermediate sections 26 of the mold. When the mold sections 24 and 29 are in engagement with the shoulders 71 and 72, the mold is completely closed, and the mold cavity is of proper dimensions to fit snugly about the keg B.

Figure 1:
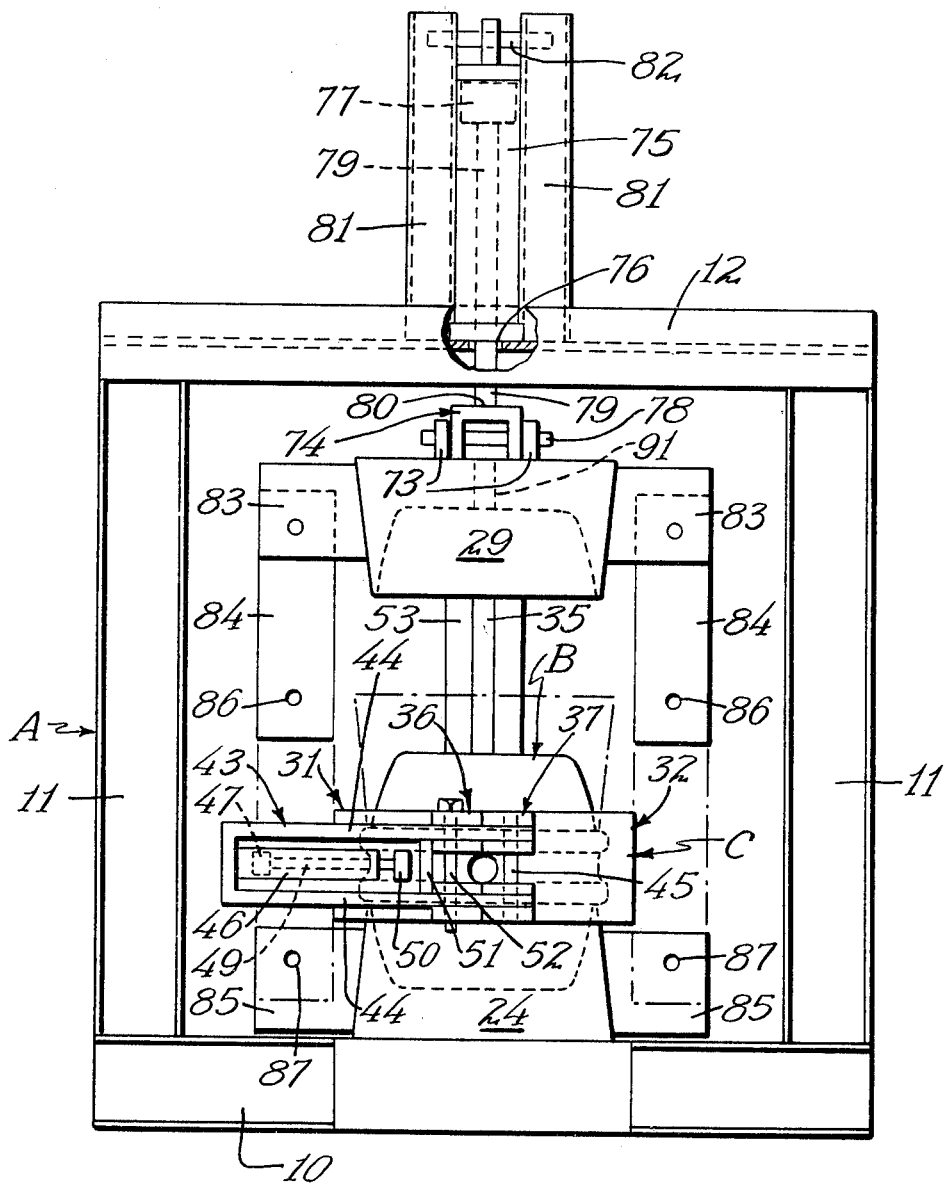
FIGURE 1 is a front elevational view of the keg reshaping apparatus with the upper portion of the die shown in full line in open position, and in broken lines in closed position.

As indicated in FIGURES 1 and 2 of the drawings, a pair of spaced uprights 73 is welded or otherwise secured to the upper surface of the top mold section 29. A cylinder 75 is provided with a lower end 76 secured to the cross-member 12, and a piston 77 slidable in the cylinder 75 is provided with a piston rod 79 welded to the top cross-member of a yoke 74 as is indicated at 80. Yoke 74 is secured to uprights 73 by pin 78. The upper mold section 29 is raised and lowered by operation of the piston 77 in the cylinder 75.

The cylinder 75 is reinforced by spaced vertical square ports 81 welded to the cross-member 12 and pinned together at their upper ends at 82. The lowering of the top mold section 29 acts to flatten out any portions of the keg which are beyond the normal periphery of the keg body. In other words, the top mold section is forced downwardly into place to press any outwardly bulged portions of the keg within the normal shape of the keg. Thus when the mold is closed, all of the deformed areas are within the normal original contour of the keg body.

Pairs of ears 83 are arranged in diametrically opposed relationship to extend in a generally radial direction from the center of the top mold section 29. These arms or ears are best illustrated in FIGURE 3. Vertically extending bars 84 are pinned between the ears 83 to depend downwardly therefrom. In the lowered position of the upper mold section 29, the lower ends of the bars 84 extend between similarly located ears 85 on the lower mold section 24. The bars 84 are provided with apertures 86 extending thereto and which are movable into registry with cooperable apertures 87 in the ear 85. When the upper mold section 24 is completely lowered, the apertures 86 and 87 are in registry. Bolts or pins 89, one of which is shown in broken lines in FIGURE 1 of the drawings, may be inserted through the bars 84 and ears 85 in order to anchor the body of the mold from separation.

As indicated in FIGURE 5 of the drawings, the upper end 65 of the keg B is normally provided with a central recessed thickened area 90 through which extends the passage 23 which is of somewhat smaller diameter than the bung opening 21. The upper mold section 29 is provided with an axial passageway 91 which communicates with the opening 23. The passage 91 and the registered passage 23 forms a means of filling the keg with water which is a part of the forming method.

In carrying out the method, the keg B is placed in the lower section 24 of the mold while the upper section 29 is in an elevated position, and while the semi-circular ring sections 31 and 32 are swung apart. The flattened area 14 engages a similarly shaped area in the mold so that the kegs will fit into the mold section 24 in only one position. In this position, the bung opening 21 is between the outwardly spread ends of the sections 31 and 32.

The bung hole closing apparatus illustrated in FIGURE 6 is then attached, the cross-member 62 bridging the inside of the bung hole and the positioning plate 60 holding the threaded shaft 59 concentric with the opening. The expandable plug 65 is slid into the bung opening, the space pipe 67 slid against the washer 66, and the nut 69 is tightened to expand the plug 65 and to close the bung hole.

The sections 31 and 32 are then swung together, and the locking frame 43 is swung into the position indicated in FIGURE 4. The locking bolt 52 is inserted after the two sections have been drawn together by the cylinder 46. Either at this stage of the operation or after the mold has been completely closed, the keg B is filled with water. The explosive charge may also be inserted at this point. The explosive may be in the form of a flexible rope-like member which is normally supplied on reels and looks like a clothesline. An explosive known as "Primacord" made by the Ensign-Bickford Company of Sunsbury, Conn., is of this type. A detonating cap is applied to an end of the explosive cord, and wires are inserted through the apertures 91 in the upper mold section 29 and the explosive charge is lowered through the aperture 23 into the interior of the keg. If desired, this may be accomplished through the use of a small diameter rod which may locate the charge near the center of the keg.

If the upper mold section 29 has not as yet been lowered, the cylinder 75 is operated to lower the mold section, forcing the keg inwardly if necessary to eliminate any outwardly extending bulges. When fully lowered, locking pins 89 are inserted through the bars 84 and ears 85 to firmly lock the parts together. The detonating cap is then exploded, creating the necessary internal force within the keg. This force is sufficient to expand the entire area of the keg against the mold, returning the keg to its original shape. The bung hole closing device illustrated in FIGURE 6 is then removed, and a portion of the water is removed to facilitate the handling of the keg. The sections of the mold are opened up and the keg is tilted out of the lower mold section 13 and the operation is complete.

As will be seen, much of the work normally necessary to repair the keg has been eliminated. The keg may be repaired in the limited time required to place the keg in the mold, fill the keg with water, detonate the charge and then remove the keg from the mold. Thus the entire operation can be completed in much less time than was previously required for shaping the ends of the keg with a die inserted through an opening in the keg, even disregarding the time required to cut the opening in the end of the keg, and rewelding this disc back in place. Furthermore, the operation is much better than the previous method from an appearance standpoint, as the circle of welding in the keg end is eliminated. The momentary hydraulic force required to expand the keg against the die is sufficient to return the keg virtually to its original shape, and the massive mold which encloses the keg during the expansion thereof eliminates any danger to the operator.

In certain instances, means have been provided for virtually closing the opening 91 during the explosion. However, closing this opening appears to be completely unnecessary due to the speed with which the keg is straightened. In other words, the sudden force acts in all directions, and the minor amount of water which is forced through the opening 91 apparently has no effect on the results obtained.

Hydraulic pressure may be applied by other means than that described. For example, high pressure fluid may be forced into the mold to restore the keg to its normal shape. However, in preferred form, the explosive is used. The explosive creates an instantaneous pressure which is substantially momentary, and the sudden force effectively returns the keg to shape. The explosive method also eliminates the need for high pressure conduits and the means for creating the high pressure.

In accordance with the patent office statutes, we have described the principles of construction and operation of our improvement in method and apparatus for repairing kegs, and while we have endeavored to set forth the best embodiment thereof, we desire to have it understood that changes may be made within the scope of the following claims without departing from the spirit of our invention.

We claim:

1. A keg repairing apparatus for use in repairing deformed aluminum kegs and the like by internal hydraulic pressure including a die having a cavity to conform with the normal outline shape of the keg, said die including a first end portion conforming to the normal shape of the lower end of the keg, a second end portion conforming to the normal shape of the upper end of the keg, and an intermediate portion shaped to fit the center portion of the keg and formed in two separable sections each adapted to enclose on half the circumference of the keg, and including interlocking means for interconnecting said separable sections while an explosive charge is detonated within the keg, said interconnecting means including a plurality of projecting ears on said separable sections, a frame hinged to the ears of one of said separable sections, and pin means connecting said frame to the ears of the other separable sections.

2. A keg repairing apparatus for use in repairing deformed aluminum kegs and the like by internal hydraulic pressure including a die having a cavity to conform with the normal outline shape of the keg, said die including a first end portion conforming to the normal shape of the lower end of the keg, a second end portion conforming to the normal shape of the upper end of the keg, and an intermediate portion shaped to fit the center portion of the keg and formed in two separable sections each adapted to enclose on half the circumference of the keg, one of said portions being fixed and the other of said end portions being movable toward and away from said one end portion, said other end portion being slidably supported on a pivot shaft, and in which an end of each of said separable section are pivotally supported on said pivot shaft.

3. The structure of claim 2 and including means for interlocking the ends of said separable sections opposite end ends thereof pivotally supported on said pivot shaft and separably connected by hydraulic means capable of pivoting said separable sections into position to bend the keg into proper external shape.

References Cited

UNITED STATES PATENTS

| | | | |
|---|---|---|---|
| 1,000,574 | 8/1911 | Bauroth | 72—62 |
| 2,625,195 | 1/1953 | Tremblay | 72—62 |
| 2,983,242 | 5/1961 | Cole | 72—56 |
| 3,222,902 | 12/1965 | Brejcha et al. | 72—56 |
| 3,224,238 | 12/1965 | Henriksen | 72—56 |
| 3,252,312 | 5/1966 | Maier | 72—56 |
| 2,222,762 | 11/1940 | Debor et al. | 72—62 |

FOREIGN PATENTS 740,699  8/1966  Canada.

RICHARD J. HERBST, Primary Examiner

U.S. Cl. X.R.

113—120